(12) United States Patent
Alexander

(10) Patent No.: US 8,156,529 B2
(45) Date of Patent: Apr. 10, 2012

(54) SYSTEM AND METHOD FOR PREPROGRAMMED PURCHASING OF TELEVISION OFFERED PRODUCTS

(75) Inventor: Ronald Alexander, Needham, MA (US)

(73) Assignee: Index Systems, Inc., Tortola (VG)

( * ) Notice: Subject to any disclaimer, the term of this patent is extended or adjusted under 35 U.S.C. 154(b) by 1170 days.

(21) Appl. No.: 10/379,294

(22) Filed: Mar. 3, 2003

(65) Prior Publication Data

US 2003/0182658 A1    Sep. 25, 2003

Related U.S. Application Data

(60) Provisional application No. 60/360,780, filed on Mar. 1, 2002.

(51) Int. Cl.
*H04N 5/445* (2011.01)
(52) U.S. Cl. ............... 725/60; 725/40; 725/42; 725/58
(58) Field of Classification Search ............ 725/40, 725/46, 49, 51, 55, 60, 61, 86, 87, 91, 98, 725/100, 1, 2, 5, 32, 38, 42, 58; 705/14.41, 705/14.53, 14.55
See application file for complete search history.

(56) References Cited

U.S. PATENT DOCUMENTS

| | | | |
|---|---|---|---|
| 4,071,697 A | 1/1978 | Bushnell et al. | |
| 4,694,490 A | 9/1987 | Harvey et al. | |
| 4,965,825 A | 10/1990 | Harvey et al. | |
| 5,353,121 A | 10/1994 | Young et al. | |
| 5,410,344 A | 4/1995 | Graves et al. | |
| 5,412,720 A | 5/1995 | Hoarty | |
| 5,583,560 A | 12/1996 | Florin et al. | |
| 5,600,364 A * | 2/1997 | Hendricks et al. | 725/9 |
| 5,678,170 A * | 10/1997 | Grube et al. | 725/9 |
| 5,710,601 A | 1/1998 | Marshall et al. | |
| 5,812,931 A | 9/1998 | Yuen | |
| 5,940,073 A | 8/1999 | Klosterman et al. | |

(Continued)

FOREIGN PATENT DOCUMENTS

WO    WO 97/31479    *    8/1997

OTHER PUBLICATIONS

Hogan, "ShopNBC Winks at ITV," Multichannel News, pp. 1-2 (Jun. 25, 2001).

(Continued)

*Primary Examiner* — Kieu Oanh T Bui
(74) *Attorney, Agent, or Firm* — Ropes & Gray LLP

(57) ABSTRACT

In one embodiment, the present invention is an improved interactive television system and method for t-commerce. The data for upcoming products is pre-loaded into the system's memory. When a product becomes available, a "trigger" appears on the Vertical Blanking Interval ("VBI") of the shopping channel that causes the system to display special graphics with which the user can interact to order a product. The displayed special graphics may include text, graphics, and/or video about the product. A user can browse a list of upcoming products and select items that he or she wishes to purchase, as soon as the products become available. The system then monitors the VBI of the shopping channel and when a trigger for a selected product appears in the VBI, the system immediately sends a message (the order form) to the order center of the shopping channel and orders the product. The system can accomplish this function unattended while the user is asleep or otherwise occupied.

57 Claims, 7 Drawing Sheets

U.S. PATENT DOCUMENTS

| | | | |
|---|---|---|---|
| 6,177,931 | B1 | 1/2001 | Alexander et al. |
| 6,308,328 | B1 * | 10/2001 | Bowcutt et al. ............... 725/111 |
| 6,331,877 | B1 | 12/2001 | Bennington et al. |
| 6,357,043 | B1 | 3/2002 | Ellis et al. |
| 6,388,714 | B1 | 5/2002 | Schein et al. |
| 6,460,180 | B1 * | 10/2002 | Park et al. ....................... 725/40 |
| 6,539,548 | B1 * | 3/2003 | Hendricks et al. ............ 725/109 |
| 6,571,392 | B1 * | 5/2003 | Zigmond et al. .............. 725/110 |
| 6,721,956 | B2 | 4/2004 | Wasilewski |
| 6,756,997 | B1 * | 6/2004 | Ward et al. ................... 715/716 |
| 6,771,317 | B2 | 8/2004 | Ellis et al. |
| 6,802,077 | B1 * | 10/2004 | Schlarb ......................... 725/104 |
| 6,810,526 | B1 * | 10/2004 | Menard et al. .................. 725/46 |
| 7,103,904 | B1 * | 9/2006 | Blackketter et al. ............ 725/32 |
| 7,110,714 | B1 * | 9/2006 | Kay et al. ..................... 455/3.02 |
| 7,150,031 | B1 * | 12/2006 | Rodriguez et al. ............. 725/58 |
| 7,421,728 | B2 * | 9/2008 | Zigmond et al. .............. 725/121 |
| 7,606,883 | B1 * | 10/2009 | Allibhoy et al. .............. 709/223 |
| 2001/0052134 | A1 * | 12/2001 | Cunningham et al. ........ 725/121 |
| 2002/0120507 | A1 | 8/2002 | Chanos et al. |
| 2002/0124247 | A1 * | 9/2002 | Houghton ......................... 725/9 |
| 2003/0005445 | A1 * | 1/2003 | Schein et al. ................... 725/51 |
| 2003/0154478 | A1 * | 8/2003 | Hassell et al. .................. 725/39 |
| 2003/0177497 | A1 * | 9/2003 | Macrae et al. .................. 725/60 |
| 2008/0184315 | A1 | 7/2008 | Ellis et al. |
| 2010/0107194 | A1 * | 4/2010 | McKissick et al. ............. 725/40 |

OTHER PUBLICATIONS

Shaw, "The Interactive Living Revolution," Multichannel News, pp. 1-3 (Mar. 31, 2003).

Waltner, "Cable Nets Eye New Interactive Services (Interactive Television)," Multichannel News, pp. 3-5 (Feb. 22, 1998).

"NDS Opens a New York Office to Focus on Developing Interactive TV Systems and Application for US Market," Business Wire, pp. 1-3 (Jan. 24, 2001).

* cited by examiner

| AD ID 1 | GUIDE CHANNEL | START TIME | DURATION | AD ID 2 | GUIDE CHANNEL | START TIME | DURATION | ... |

FIG. 5

| START TIME | DURATION 1 | AD ID 1 | DURATION 2 | AD ID 2 | ... |

FIG. 4

SYSTEM AND METHOD FOR PREPROGRAMMED PURCHASING OF TELEVISION OFFERED PRODUCTS

CROSS-REFERENCE TO RELATED APPLICATION(S)

This patent application claims the benefit of the filing date of U.S. Provisional Patent Applications Ser. No. 60/360,780, filed Mar. 1, 2002 and entitled "PREPROGRAMMED AUTOMATIC PURCHASING OF TELEVISION OFFERED PRODUCTS", the entire content of which is hereby expressly incorporated by reference.

SUMMARY OF THE INVENTION

The present invention generally relates to interactive television systems. More specifically, this invention is directed to a system and method for performing television commerce.

BACKGROUND OF THE INVENTION

Television commerce or t-commerce is conventionally viewed as a subset of interactive television and is generally defined as electronic commerce where the electronic commerce transactions occur over the medium of television, or similar devices. Although t-commerce is still in its early stages, it is projected to play a significant role in the growth and acceptance of interactive television.

T-commerce transactions may be conducted in a full screen television mode, or through an interactive program guide ("IPG"). Generally speaking, an IPG is an on-screen listing of television program information with interactive functions that enable users to navigate through, sort, select and schedule television programming for viewing and recording. An IPG may include different regions for displaying advertisements and other messages.

Alternatively, the t-commerce opportunity may be presented to a user outside of the IPG. For example, advertising or t-commerce opportunities may be presented to a user in connection with a currently broadcast television program or advertisement.

Another way of using a television for purchasing products is television shopping channels. However, television shopping channels often feature "One Time Only" and "Today's Special Value" type product spots where a product becomes available at a certain time (sometimes in the wee hours of the morning) and is only available for a few hours or until stock runs out. When the product becomes available, there is often a "frenzy" of phone calls to order the product. However, potential buyers sometimes miss the opportunity of buying the advertised product. Also, some of these offers are inconvenient for users in a particular time zone (usually an Eastern time zone) since the products are offered simultaneously over different time zones. Thus, the offer would be made three hours later in the U.S. Eastern Time Zone than in the U.S. Pacific Time Zone. This places a prime time offer for the U.S. West coast late at night on the U.S. East coast.

Therefore, there is a need for a television system and method that is capable of preprogramming purchasing of television offered products.

SUMMARY OF THE INVENTION

In one aspect, the present invention is a method for preprogrammed purchasing of television offered products. It includes receiving a first trigger instruction in a television signal; prompting a user to input order information for a product, responsive to the first trigger instruction; receiving the order information from the user; storing the received order information in a memory; receiving a second trigger instruction in the television signal; and transmitting the stored order information to a remote site, responsive to the second trigger instruction.

In another aspect, the present invention is a method for preprogramming a purchase of television offered products. It includes receiving a first trigger instruction in a television signal including information about a product; displaying the information about a product, responsive to the first trigger instruction; displaying an order form for a user to input order information for the product, responsive to the first trigger instruction; receiving the order information from the user; storing the received order information in a memory; receiving a second trigger instruction in the television signal; and sending the stored order information to a remote site, responsive to the second trigger instruction.

In yet another aspect, the present invention is a television system for preprogramming a purchase of television offered products comprising: a receiver for receiving a first trigger instruction and a second trigger instruction in a television signal; a display processor for prompting a user to input order information for a product, responsive to the first trigger instruction; a user interface for receiving the order information from the user; a memory for storing the received order information; and a back channel for transmitting the stored order information to a remote site, responsive to the second trigger instruction. The back channel transmits the stored order information to a remote site via a wireless network, a telephone network, the Internet, and/or a pager network.

BRIEF DESCRIPTION OF THE DRAWINGS

The objects, advantages and features of this invention will become more apparent from a consideration of the following detailed description and the drawings in which:

FIG. 4 is an exemplary illustration of a scheduling component of an advertisement, in accordance with one embodiment of the present invention;

FIG. 5 is an exemplary illustration of a programming component of an advertisement, in accordance with one embodiment of the present invention.

DETAILED DESCRIPTION

In one embodiment, the present invention is an improved interactive television system and method for t-commerce. The data for upcoming products is pre-loaded into the system's memory. When a product becomes available, a "trigger" appears on the Vertical Blanking Interval ("VBI") of the shopping channel that causes the system to display special graphics with which the user can interact to order a product. Alternatively, the special graphics may be stored in the memory and be displayed in response to a user request. The displayed special graphics may include text, graphics, and/or video about the product. With this pre-ordering feature, the user can browse a list of upcoming products and select items that he or she wishes to purchase, as soon as the products become available. The system then monitors the VBI of a shopping channel and when a trigger for a selected product appears in the VBI, the system immediately dials the phone (or sends a wireless message) to the order center of the shopping channel (or directly to the merchant) and orders the product. The system can accomplish this function unattended while the user is asleep or otherwise occupied.

Although, in some embodiments, the present invention uses an IPG as a platform with which to execute the innovations described herein, the invention is not IPG platform dependent. That is, for some embodiments of the present invention, it is not necessary that the user interact with an IPG. Furthermore, for some embodiments of the present invention, it is not necessary that the interactive display system of an IPG be available on the user's television. That is, according to one aspect of the present invention, administering the t-commerce transaction by the television user is independent of any user profile information and is independent of the user's interactivity with, or even the existence of, an IPG.

In order to complete the t-commerce transaction, a back channel or return path would need to be integrated with the television, and/or the IPG. The back channel could be a two-way cable, pager network, telephone network, cellular telephone network, Internet, or other similar means of upstream communication from users to service providers, merchants, or other related third parties. Those skilled in the art should realize the significant investment in infrastructure (e.g., back channel, inventory, shipping, billing systems, etc.) that is necessary to enable such t-commerce transactions. A two-way interactive television system using pager transmitter and receiver is described in U.S. Pat. No. 5,812,931; and cable and Internet back links are described in U.S. Pat. No. 6,388,714 B1; the entire contents of which are hereby expressly incorporated by reference.

Figure 1A:
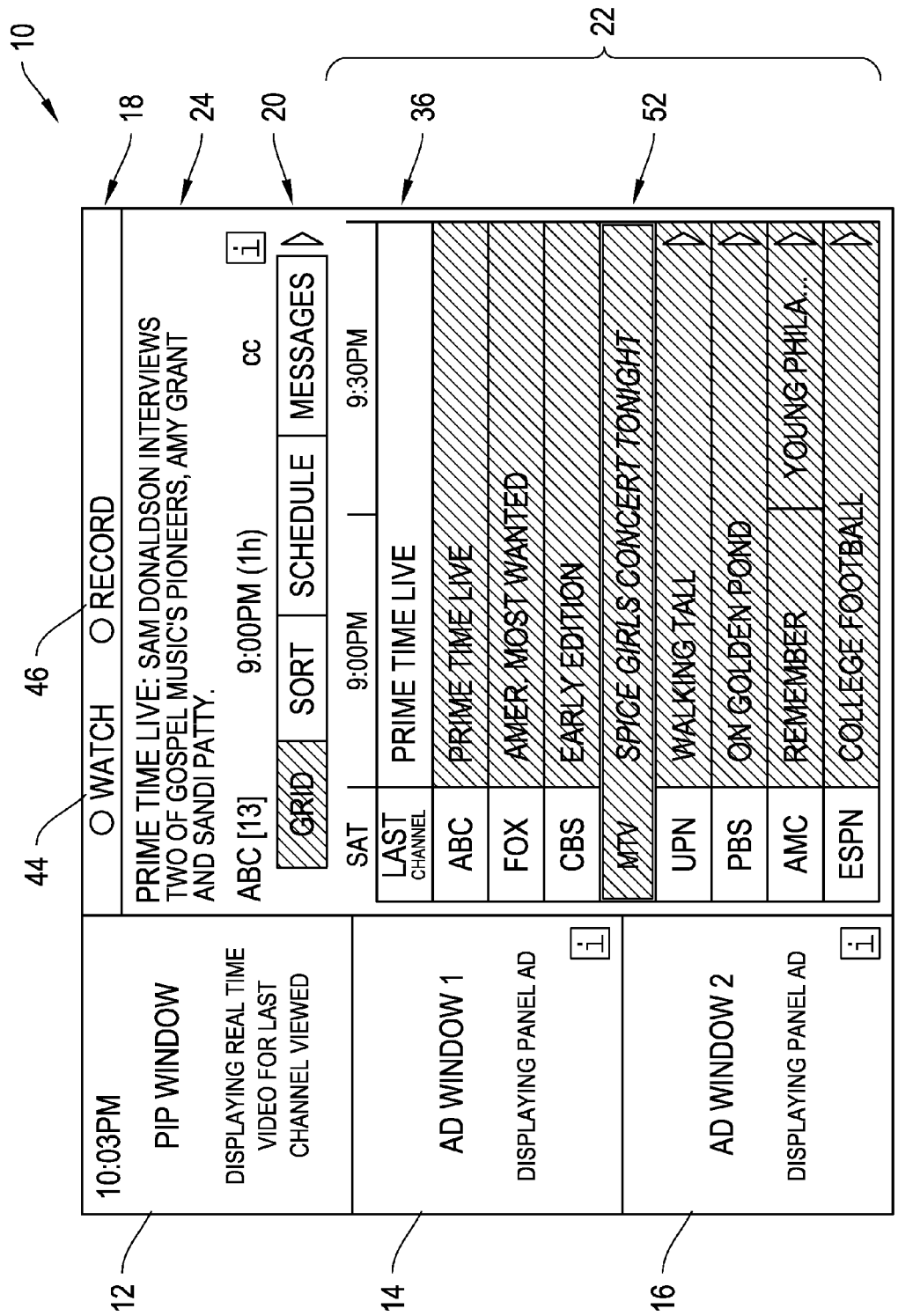
FIG. 1A is an exemplary IPG, in accordance with one embodiment of the present invention.

An exemplary IPG is illustrated in FIG. 1A. The IPG includes one or more interactive advertising panels 12, 14, and 16 through which interactive advertising or t-commerce opportunities can be delivered to users. The content delivered through the interactive advertising panels may be program or product related content. For example, advertising panel 14 may be utilized to advertise an upcoming program on one of the channels listed in the IPG. Additionally, the user may be prompted or have the ability to perform certain actions in relation to the program. For example, the user may have the option to set a reminder to tune to or record the advertised program at the time it is broadcast in the future. Additionally, the user may have the option to block access to the advertised program using a parental control feature offered by the IPG. If the advertised program is a pay program (e.g., PPV, VOD, etc.), the user might also be prompted or have the ability to purchase the advertised program. As mentioned above, such a transaction would require a back channel or return path integrated with the IPG.

Additionally, advertising panel 16 may be utilized to advertise a product through the IPG. The product may or may not be related to one or more of the programs listed in the IPG. Using a remote control or other input device, a user may select the product-related advertising panel. Selecting the product-related advertisement will provide the user with additional information about the advertised product. Additionally, the user may be prompted or have the ability to perform certain actions in relation to the product.

For example, the user has the option to purchase the advertised product. To complete the transaction, the user will be prompted to provide certain personal information (e.g., contact, credit card, billing information etc.). This information may be entered by the user at the time of the transaction, or alternatively, the user may select to use similar information that was previously stored within the system.

The IPG is capable of collecting extensive information concerning a particular user, described as a user's profile. Creation of a user's profile is disclosed in U.S. Pat. No. 6,177,931 B1 ("the '931 patent"), the entire content of which is hereby expressly incorporated by reference. Also described in the '931 patent is the utilization of a user's profile to customize the presentation to the user of advertisement. In the '931 patent, the presentation of advertising is customizable for every mode in which advertisement is presented to the user, including the customization of advertising presented as part of the IPG display and the customization of advertising delivered by the television tuner.

Referring back to FIG. 1A, a television screen display 10 is shown. Display 10 could be generated by a conventional television receiver with interlaced scan lines, by a VCR, by a PC monitor with progressive scan lines, or by any other type of video display device. In the upper left hand corner of the screen is a picture-in-picture (PIP) window 12. Below window 12 are Panel Ad Windows 14, and 16 ("Ad Windows"). Windows 12, 14, and 16 each typically occupy about ⅑ of the total screen area. The remainder of the screen area is typically occupied (moving from top to bottom of the screen) by an action key bar 18, a navigation bar 20, a grid guide 22 ("Grid Guide"), and an information box 24 (the "detailed information area). In the embodiment pictured in FIG. 1A, the position of the windows, and other user interface features, including the action key bar, navigation bar and Grid Guide, are fixed. In another embodiment of this invention, as is described further below, the position and size of the windows and other user interface features are customizable by the user.

Figure 1B:
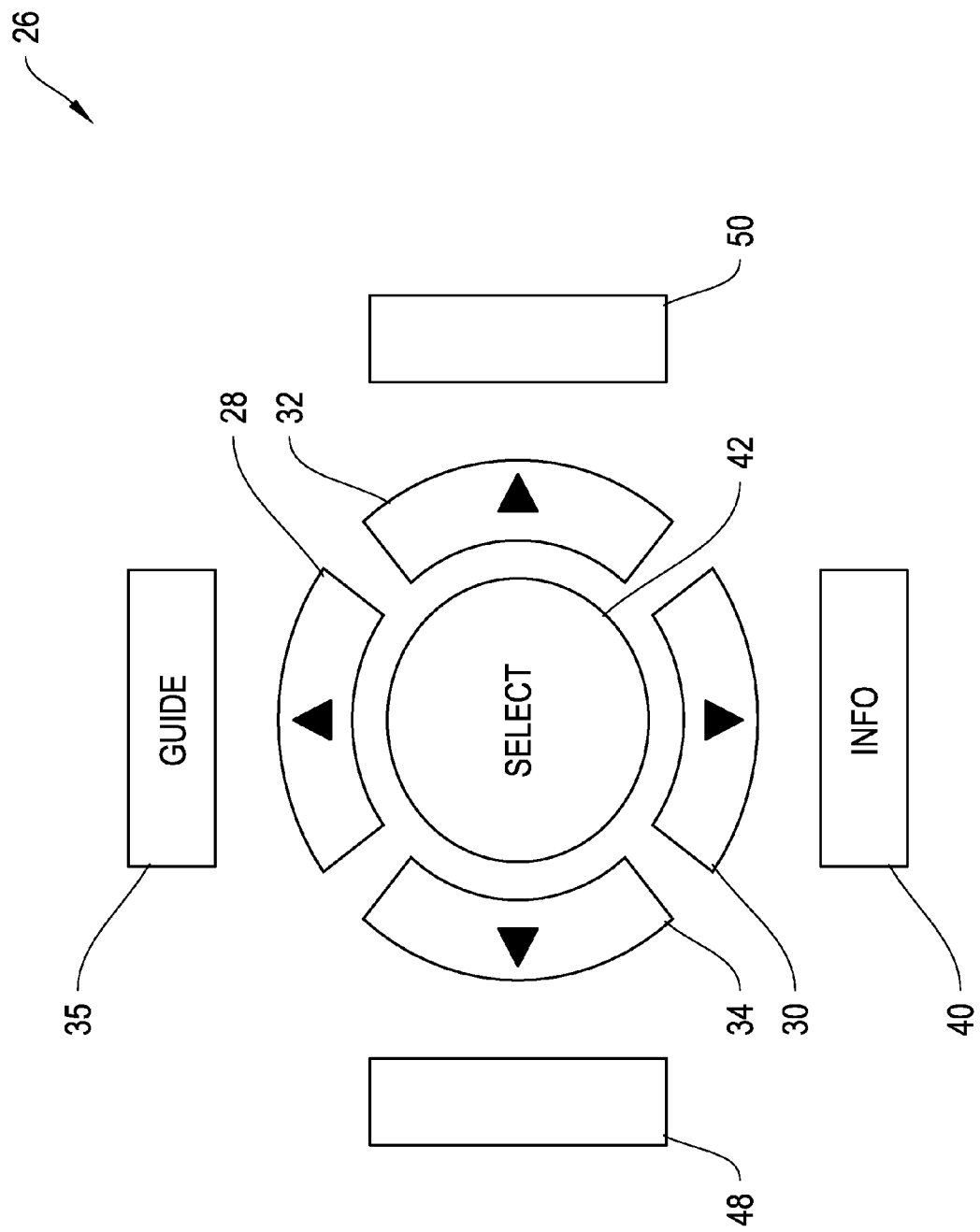
FIG. 1B is an exemplary remote controller, in accordance with one embodiment of the present invention.

In FIG. 1B of the drawing, one embodiment of a remote controller 26 for activating the functions of display 10 is shown. Remote controller 26 could have other keys for activating the functions of a user video device, such as a television receiver, a VCR, or a cable box. Remote control 26 has up, down, right, and left arrows keys 28, 30, 32, and 34, respectively, for controlling the movement of a cursor 36 on display 10. Cursor 36 can select, i.e., highlight, any of windows 12, 14, or 16 by pressing arrow keys 28 to 34, any of the titles and channels in Grid Guide 22 by pressing arrow keys 32 and 34, or navigation bar 20 by pressing arrow keys 32 and 34. Windows 12, 14, and 16 are highlighted by adding a border around the window or changing the color of the border, if the border is permanent. The titles and channels in Grid Guide 22 and navigation bar 20 are highlighted by changing color.

Highlighting of windows and/or user selections from the Grid Guide and/or navigation and IPG on screen display components may be accomplished in a number of other ways. For instance, the border of a selected window, or the selected Grid Guide or navigation component, can be made to appear to flash. Another way to highlight a user selection is to make the selected window or feature appear to become brighter than the rest of the on screen display. Yet another way to highlight a user selection is to blur all portions of the on screen display, except for the user selected component. Still another way to highlight a user selection is to make all portions of the on screen display, except for the user selected component, appear transparent. Still yet another way to highlight a user selection is to add animation to the selected component. When a portion of the IPG is selected, the system issues graphic display commands to a video display generator to implement one or more of the desired functions.

The user enters the Guide Mode illustrated in FIG. 1A by pressing a "guide" key 35 and returns to the full screen Television Mode by pressing key 35 again or by pressing the "select" key. A real time television program is displayed in window 12. A translucent overlay of the PIP window 12 can display the title, channel (local number and/or station name), and status (locked or unlocked) of window 12 over the television program so the user can still see the entire image.

The PIP Window can be locked or unlocked. The "lock/unlock" mode is user controlled. To lock or unlock the PIP Window, the user can use a PIP button on the remote control device, or can highlight and press the Lock/Unlock IPG action button. The lock/unlock status is recorded and maintained until the status is reset by the user. That is, the lock/unlock status for the PIP Window in the IPG is maintained when the user leaves the Guide and later re-enters the Guide, including when the user turns off the television. If the user selects the "lock" status, the last channel to which the tuner was set in the PIP Window continues to be displayed regardless of the actions exercised by the user. In the unlocked status, the channel highlighted by cursor 36 in Grid Guide 22 is displayed if the Grid Guide is displaying currently telecast programs and the last currently telecast channel that was highlighted is displayed if the Grid Guide is displaying future programs.

There are generally three results to leaving the Guide, depending upon the way the user leaves the Guide. If the user, while in the IPG, wants to watch in full screen mode the program shown in the PIP Window, then the user can press the Guide button on the remote control device. If the user, while in the IPG, highlights a particular channel in the Grid Guide, and then presses the "select" button, the user will leave the Guide to view in the full screen mode the television program that the user highlighted in the Guide. If the user, while in the IPG, presses the "clear" or "cancel" button on the remote control device, then the user will leave the Guide and return to the television program that the user was watching immediately before entering the Guide.

Typically, an ad for a future telecast program is displayed in window 14. This ad is linked to the time and channel of the program in a memory so the user can watch or record the program automatically by pressing the blue left action button to watch the program, or the green right action button to record the program.

Typically, an ad for a product or service is displayed in window 16. This ad is linked to more information about the product or service in the memory so the user can read one or more pages about the product or service in window 16 by pressing an "info" key 40 one or more times. Alternatively, this ad is linked to the time and channel in memory that an infomercial about the product or service will be telecast so the user can watch or record the infomercial automatically by pressing "select" key 42.

Bar 18 displays a blue button 44 and/or a green button 46 with legends that depend upon the context of the information displayed on the screen. Remote controller 26 has corresponding keys 48 and 50, respectively, to activate the functions represented by blocks 44 and 46.

From window 12, 14, or 16 the user moves to grid guide 22 by pressing arrow key 32. (From grid guide 22 the user moves to window 12, 14, or 16 by pressing arrow key 34.) In grid guide 22 the user moves cursor 36 to highlight one of the nine tiles in which channel and title are displayed by pressing arrow keys 28 and 30. The user can view program listings scheduled at future times by pressing keys 32 or 34 to move horizontally about the Grid.

From grid guide 22 the user moves to navigation bar 20 by pressing arrow key 28. Initially, the center button is highlighted. To highlight a different button, arrow key 32 or 34 is pressed. To enter the screen represented by the highlighted button, "select" key 42 is pressed.

In grid guide 22 details about the program represented by the highlighted tile are displayed. If more information is available an icon is displayed and such information is displayed in the area occupied by grid guide 22, instead of the grid guide by pressing "info" key 40. To return to the grid guide, "info" key 40 is pressed again. After an action button has been pressed or an icon on navigation bar 20 has been activated, an instructional prompt may be substituted for the program information in information box 24.

In addition to the tiles representing television programs, a virtual channel ad can be displayed in grid guide 22 on a tile 52. A virtual channel ad may promote, for instance, a current or future television program. Such a virtual channel ad for a television program is linked to the time and channel of the program in RAM so the user can watch or record the program automatically by pressing "select" key 42 in the manner described in the referenced application. More than one virtual channel ad may be stored in RAM, but preferably only one such ad is displayed at a time.

In some embodiments, data for the IPG schedule, and/or supplemental information relevant to the program listings, and/or advertising data, can be downloaded to the memory resident at the user's television system. In one embodiment of the download data system, the user asks the IPG to make certain types of information available; the IPG uses an index of where to find the information and automatically connects to the appropriate data source and will download the information. Data for the IPG schedule, and/or supplemental information relevant to the program listings, and/or advertising data, can be downloaded from various sources. In one embodiment, data is downloaded from the Internet. In other embodiments of the download data system, the user is asked to tune to a particular channel at a particular time if the user is interested in accessing and downloading particular types of information.

Not all embodiments require that data be downloaded to the IPG memory. In one embodiment, the IPG scheduling data, supplemental data and/or advertising data and the software to format, display, and navigate the IPG scheduling data, supplemental data and/or advertising data is accessed by the user's television system through a direct link between the user's television system and the Internet.

In one embodiment of the above-described direct-link to the Internet, the user's television is connected to the Internet by telephone line via modem, cable modem, by other two-way communication device, including wireless modem communication devices, and/or by other conventional methods of communicating with the Internet. The initial connect web site address may be supplied, for instance, through information transmitted to the user's television over the VBI. The user may also be provided with a selection of multiple IPG Internet web sites. The user uses the remote control device to select one of the IPG Internet web sites The user's television system is programmed to emulate a computer having on-line access to the Internet. Once the connection between the user's television system and the Internet is made, the user has two-way communication with the on-line Internet service providers (e.g., of the IPG related information). The user can then navigate through the IPG. Furthermore, in one embodiment, in which keyboard user interface is available, the user can enter chat rooms or other interactive services.

In one embodiment, when the user highlights a particular program in the Guide, the Ad Window, or a Virtual Channel Ad Slot, or makes other access requests to detailed program-related information, the IPG connects the user with an external database of information, such as with a particular web site on the Internet. The user can instruct the IPG to connect the user with detailed specialized information guides/data services, such as sports, news, or other guides/data services. In one embodiment, the linking to the external data source is accomplished by storing a web site address with the Ad Window or Virtual Channel Ad Slot advertisement in the memory of the user terminal.

In one embodiment, the user can access the Internet to send and receive e-mail. In another embodiment, the television terminal is separately addressable, and the head end controls e-mail traffic between users on its network. In one embodiment, to facilitate two-way transmission or a toll free number is used as a back link. E-mail can then be sent to the appropriate user through the VBI to the user's separately addressable television.

In a Recording Function, the user instructs the IPG what programs to add to the Record List, which is the list of programs and related programming schedule information, for programs that the user want to have recorded. The user can identify the frequency/regularity with which the user wants to record each program listed in the Record List.

The user can enter the Recording Function in a number of ways. The user can press the "Record" key, if there is one, on the user's remote control device. Alternatively, the user can "press" a "Record" action button on the IPG display. One embodiment of the present invention provides the user with the option of recording a particular program "regularly." The "regularly" option can be selected when the user highlights a particular program title on the IPG Grid Guide. User selection of the "regularly" option instructs the VCR control system (or other recording devices) to record the particular title on the selected channel at the selected time slot any day of the week that the program is telecast. If a telecast of the selected title is preempted by another program, the new program is not recorded. The change in the telecast schedule is determined by comparing the title of the selected program to the title of the program actually telecast. In one embodiment of the invention, it is assumed that the title of the program actually telecast is carried in the vertical blanking interval of the television signal. When the user has instructed the IPG to "regularly" record a particular program, if the selected program is preempted by another program, the preempting program is not recorded and the IPG displays a message notifying the user that the selected program was preempted and was not recorded.

In one embodiment, the user can instruct the IPG to record programs on recordable Digital Video Discs (DVD's), hard disks, or other high capacity recording mediums. Because of the extended storage capacity of DVD's, the user can instruct the IPG to record and index an extended period of programming. For instance, the user can instruct the IPG to record and index with certain numbers, e.g., 4 hours of CNN news broadcasts. When the user is ready to view the DVD (or hard disk) recording, the IPG displays the index on screen. The user can then select to view either the entire recording, or only those portions of the recording in which the user is interested.

In one embodiment, program-level indexing of recorded programs is created. In another embodiment, intra-program indexing is created by using information transmitted in the VBI of the video transmitted. In this embodiment, a recording of CNN would likely show indexing breakdowns that include themes, such as "International News," "National News, " "Sports," "Entertainment," "Business & Finance," and "Weather."

The IPG user interface (UI) screen provides for multiple viewable "windows." One window presents the IPG Grid Guide. Another window presents the picture-in-picture (PIP) window on which the currently tuned program is displayed. Another window displays advertising information (the "Ad Window"). Advertising may be in the form of graphics and textual information. Alternatively, advertising may be in the form of video display. In one embodiment, the Ad Windows are interactive.

As described further below, the user can also highlight the Ad Window. Doing so will cause additional text describing the product to be displayed in the detail box are of the IPG Grid Guide.

If the Ad Window displays information about a particular product, pressing a record button will instruct the IPG to record an infomercial, to the extent that one is scheduled for a future time. Alternatively, the Ad Window can display information about a future-scheduled television program or about a series of programs to be telecast over a period of time. In that case, pressing a record button will instruct the IPG to record the future-scheduled program. Alternatively, the user can designate the program for the Watch List.

In one embodiment, the user navigates from the Grid Guide to the PIP Window by pressing the left arrow key until the cursor/highlighting reaches the PIP Window. From the PIP Window, the user uses the right arrow key to move back to the Grid Guide. In one embodiment, moving from the PIP Window to the Grid Guide causes the cursor to scroll to the very top of the Grid Guide lineup. From the top of the Grid Guide lineup, pressing the up arrow key moves the cursor to the navigation bar. The IPG provides several possible destinations on the navigation bar, e.g., info center, sports, news, set up, help, etc.

In one embodiment, the position and size of the windows and other user interface features are customizable by the user. In one embodiment, the IPG creates special translucency visual effects. To create the translucency effect, the system alternates the display format pixel by pixel, wherein one pixel is the color of the overlay and the next pixel is transparent. In one embodiment, the IPG is capable of formatting on-screen notifications (messages) to the user and displays the notification to the user. On-screen notifications can be used to alert the user to any number of possible items of information. For instance, the IPG can notify the user that a product is available to be purchased, or that the IPG will begin recording a particular program within a certain amount of time, e.g., 2 minutes. The record notification could further ask the user whether to switch the cable box or other tuner (e.g., a satellite receiver) to record the program. If the user indicated that the user did not want the IPG to switch to the cable box to record the program, then the IPG would delete the program from the record list. Another example would be to notify the user that a program that may be of interest (e.g., as determined from analyzing the User's Profile) will be broadcast on another channel within a certain amount of time, e.g., 2 minutes. The IPG could then ask if the user wants to view the program on the other channel. If the user indicates that the user wants to watch the program on the other channel, then the IPG will automatically tune to the other channel at the appropriate time. Alternatively, the IPG could ask the user if the user wants to record the program on the other channel and could then record that program at the appropriate time if the user answers affirmatively.

If the television is in television mode, the notification will be displayed on-screen. The notification can be displayed in a number of ways, including: 1.) a complete screen overlay; 2.) a partial screen overlay; 3.) The real time program video is automatically changed to a PIP format, and the notification is displayed outside of the PIP window; 4.) The real time program video is automatically changed to a PIP format, and the notification is displayed inside of the PIP window; 5.) as a "watermark" somewhere on-screen; 6.) an on-screen icon is displayed which can be "pressed" by the user using the navigation keys on the user's remote control device, and which, if pressed, displays the notification in one of the above formats; 7.) the program video is compressed slightly to fit in some percentage, e.g., 90%, of the top of the screen, and the notification is displayed as a horizontally-rolling message at the bottom of the screen; and 8.) the program video is compressed slightly to fit in some percentage, e.g., 90%, of the bottom of the screen, and the notification is displayed as a horizontally-rolling message at the top of the screen.

If the television is in some mode other than the television mode, the IPG can notify the user through some modification of one of the above-described formats. For instance, if the television is in the Grid Guide mode in a PIP format, then the IPG could use any of format numbers 1.), 2.), 5.), 6.), 7.), 8.) or, the IPG could notify the user by displaying the notification in the Ad Window, a virtual ad channel slot, in the detail information window, or in a horizontally-rolling message at the top or bottom of the screen.

The IPG is also capable of supporting parental control of the IPG display. In one embodiment, the Parent user initially enters the Parental Control Function during initial IPG setup procedures. In the IPG setup procedure, the Parent identifies all users of the television, and assigns individual user Identifiers. The Parent user also establishes a password for said Parent user. U.S. patent application Ser. No. 09/310,433, filed on May 12, 1999 ("V-CHIP Plus+: In-Guide User Interface Apparatus and Method") describes Parental Control setup procedures for the identification of individual users and initialization of password protection, the entire content of which is hereby expressly incorporated by reference.

In the Parental Control Function, the Parent selects the channels and programs that can be visible in the Grid Guide for a particular user and selects channels and/or programs that are to be blocked from viewing. Child users, as identified during setup procedure, will view a simplified Grid Guide and will be blocked from viewing the programs so marked by the Parent. In one embodiment, individual users are identified by user ID and password. In another embodiment, individual users have different remote control devices, the use of which is also password protected.

Figure 2:
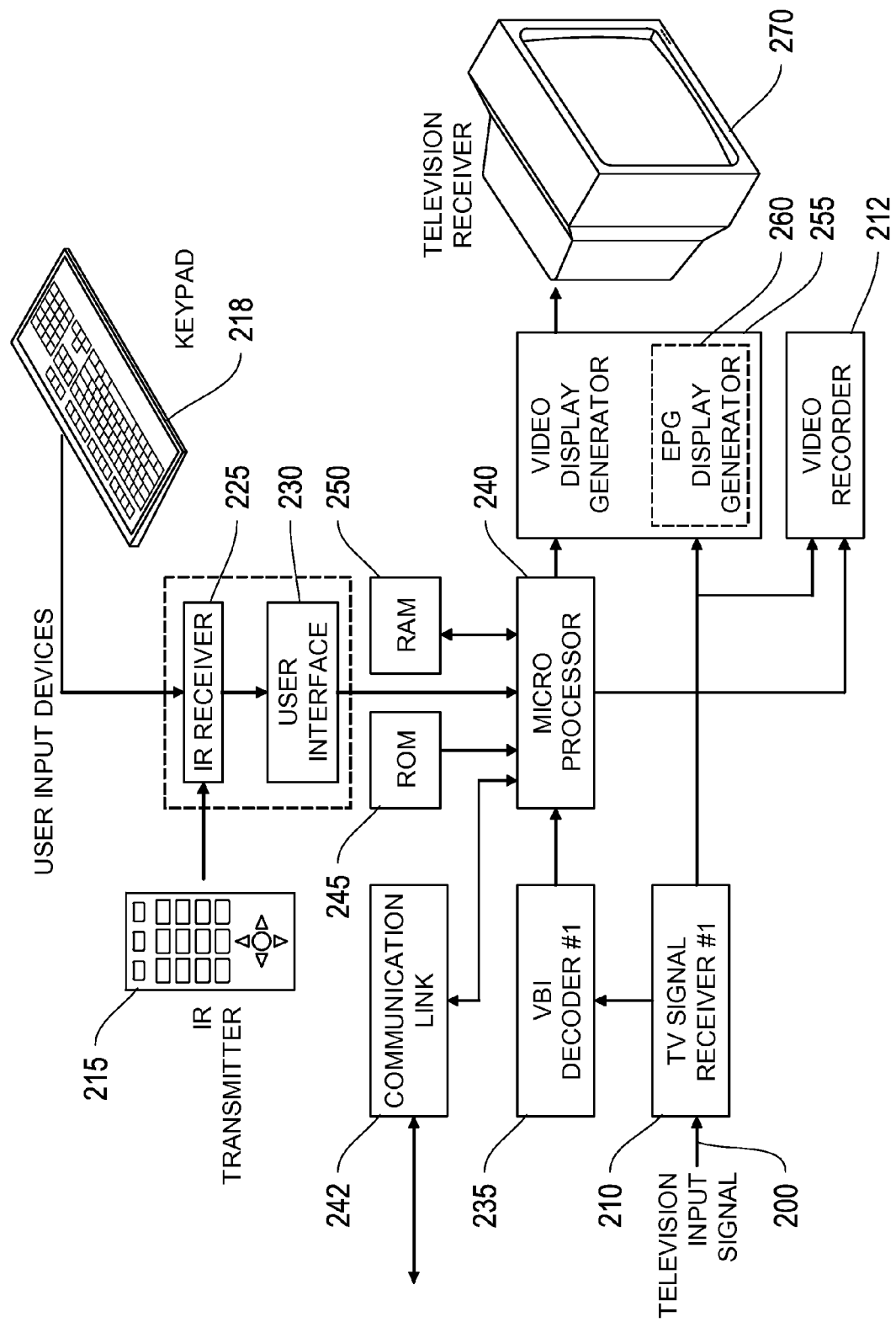
FIG. 2 is an exemplary block diagram of a television system, in accordance with one embodiment of the present invention.

FIG. 2 is an exemplary block diagram of a television system, in accordance with one embodiment of the present invention. According to a pre-established criteria, the head end delivery provider inserts a trigger command in the VBI of one or more television signals. Optionally, the trigger command is accompanied by a duration, expressed, for instance, in seconds. The pre-established. criteria for the VBI trigger command insertion can be based on, for instance, a schedule of advertisements as identified in a channel, program and advertisement scheduling table. Alternatively, the head end delivery provider interrogates the outgoing signal and detects a particular event, such as, for instance, a change from television programming to commercial advertising. The trigger command instructs the receiving television set to initiate specific functions, as described below.

As shown in FIG. 2, the television receiver 210 receives the input television signal 200 by a tuner. The television receiver sends the television signal to the VBI decoder 235 to decode the information carried in the VBI of the signal. The VBI decoder 235 then sends the decoded VBI information to the microprocessor 240 for analysis. The user interacts with the system using a remote controller (IR transmitter) 215 and/or a keypad 218. Other user input devices such as voice recognition devices may also be used. The IR receiver receives user's commands and passes the commands to the user interface unit 230. The user interface unit then passes the commands to the microprocessor 240 to process the input commands. A video recorder 212 can be instructed by the microprocessor to record television programs at the specified time.

In one embodiment, the trigger instruction for displaying graphics with which the user can interact to pre-order a product is implemented when the user is watching the television in television mode. In this application, television mode refers to the operation of a television whereby the user is watching the television with the television display fully occupying the television's display monitor, and during a time when real-time television signals (as opposed to recorded video signals) are displayed on the television.

Consider then, a particular user's television set 270 that is tuned to Channel A. When the microprocessor 240 receives a first trigger command in the VBI of Channel A from the VBI decoder 235, the microprocessor causes the video display generator 255 to display special graphics with which the user can interact to select a product to be ordered later. Alternatively, the special graphics may be stored in the RAM and be displayed in response to a user command. When the microprocessor receives a second trigger command in the VBI of the television signal for automatic ordering of a selected product, the system immediately dials a phone (or sends a wireless message, or an Internet message) through the communication link 242 to an order center (or a merchant) and orders the product. If the VBI trigger command is accompanied by a duration component, then the special graphics with which the user can interact to order a product is displayed for the duration expressed in the VBI command.

During a full screen advertisement, an icon may appear on the screen to alert the user that an interactive advertising or t-commerce opportunity is available. Using a remote control or other input device, a user may select the icon. Selecting the icon provides the user with additional information about the advertised product and means for ordering the advertised product. For example, the user may be presented with additional information and instructions on how to order a pizza or a camera directly through the television.

The trigger instruction of the present invention can also be implemented if the user is in the IPG mode. In this application, IPG mode refers to the operation of a television whereby the user has activated the IPG. In this mode, the special graphics with which the user can interact to select a product to be ordered is displayed in the IPG by the IPG display generator 260. Similar to the previously-mentioned embodiment, when the user's television set receives the trigger command, the system immediately sends a message through the communication link 242 to the order center and orders the product. In this embodiment, the special graphics is generated by the IPG display generator 260 in a location within the displayed IPG (e.g., a panel ad area).

Figure 3A:
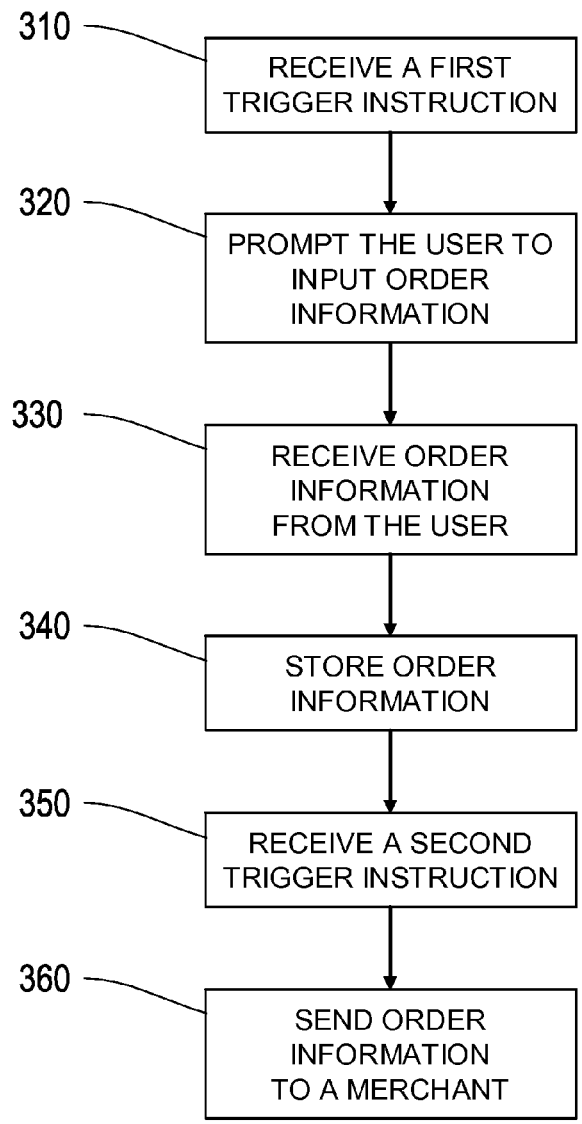
FIG. 3A is an exemplary flow diagram for programing an ordering of a product, in accordance with one embodiment of the present invention.

FIG. 3A is an exemplary flow diagram for programming an ordering of a product, according to one embodiment of the present invention. In block 310, a television receiver (or a similar device) receives a first trigger instruction in the VBI of a television signal. The first trigger instruction may include information about one or more products, for example, in form of an advertisement. If the first trigger instruction includes information about one or more products, the information is stored in the system memory. Alternatively, the advertisements (product information) may have already been received and stored (pre-loaded) in an advertisement database. Responsive to the received first trigger instruction, the system prompts the user to input order information, as shown on block 320. In one embodiment, the system displays a list of different products that will be offered by one or more merchants in future. The display may include more detail information about each displayed product in the form of text, graphics, and/or video clips. The displayed list may be an entire, or a portion of a catalog offered, for example, by Sears, Macys, or any other merchant that offers a catalog.

The user can select one or more products from the displayed list. Responsive to the user's selection of one or more products, the system displays an order form for the selected product(s). The order form may already include information about each selected product, as required by the form. The order form may also include user information such as, name, billing address, credit card information, and similar information about the user. The user information may be retrieved from the user profile file stored in the system memory. As mentioned above, the prompt information may be displayed on a television screen, while the user is using the system in a television mode. Alternatively, the prompt information may be displayed in an area within a guide, if the user is using the system in a guide mode.

Order information from the user is received by the system in block 330, and stored locally in the system memory, as shown in block 340. At a later time, when a second trigger instruction is received by the television (block 350), the system transmits the stored order information to an order center or a merchant in block 360. The address (phone number, URL address, or any other type of electronic address) of the order center (or the merchant) may be received from the first trigger instruction and stored (with the order information) in the memory. Alternatively, the address of the order center may be received by the second trigger instruction.

Figure 3B:
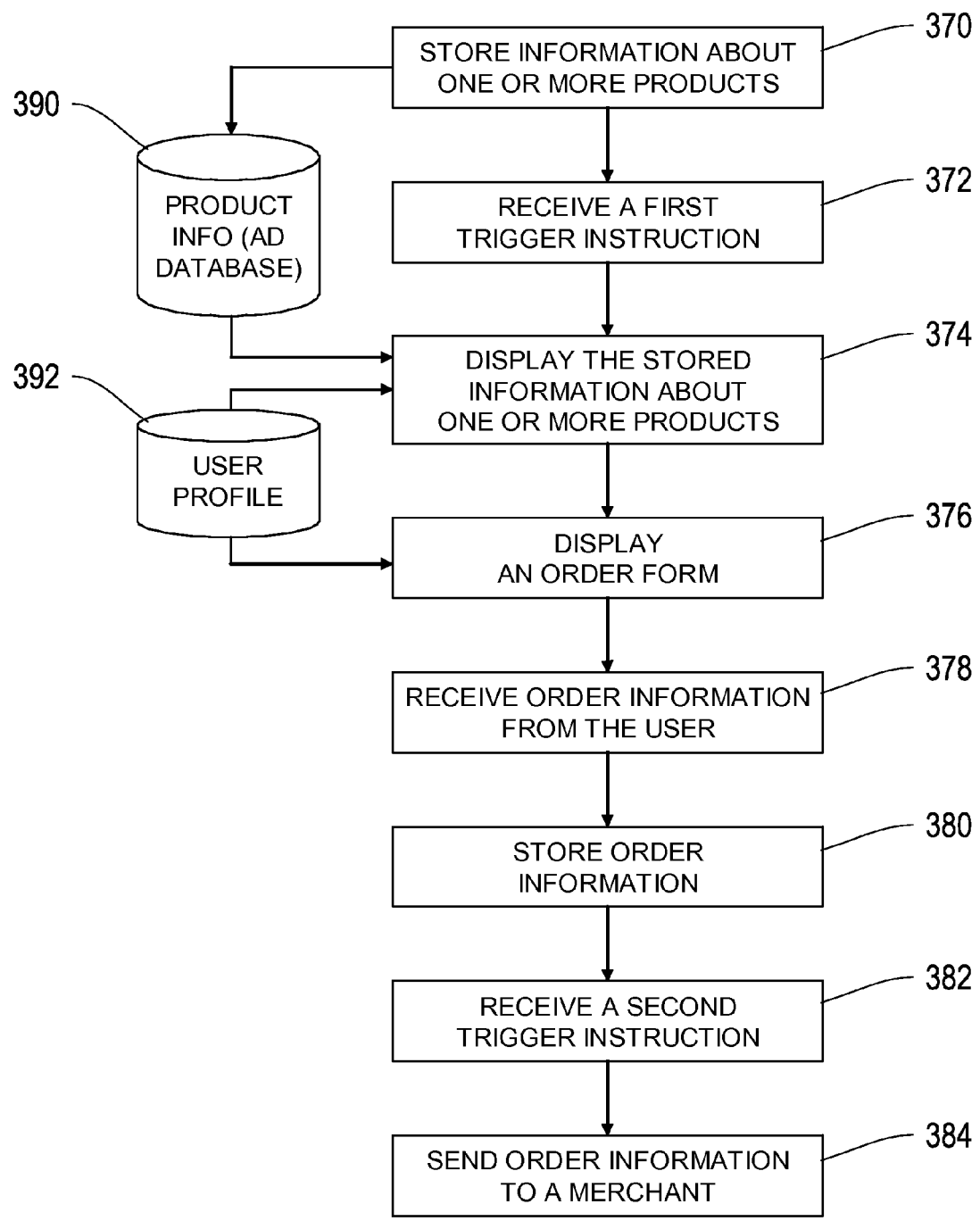
FIG. 3B is an exemplary flow diagram for programing an ordering of a product, in accordance with another embodiment of the present invention.

FIG. 3B is an exemplary flow diagram for programing an ordering of a product, according to another embodiment of the present invention. Information about one or more products, for example, in form of an advertisement are pre-loaded is the memory in block 370. Then, a television receiver receives a first trigger instruction in the VBI of a television signal in block 372. Alternatively, the first trigger instruction may include information about one or more products. Responsive to the received first trigger instruction, the system displays at least a portion of the stored information 390 about one or more products, as shown on block 374.

In one embodiment, the system displays a list of different products that will be offered by one or more merchants in future based on a user profile 392. Alternatively, the information about one or more products transmitted in the first trigger instruction may be tailored to a particular user based on the user's user profile. The displayed information may include more detailed information about each displayed product in the form of text, graphics, and/or video clips. Again, the displayed list may be an entire, or a portion of a catalog offered, for example, by Sears, Macys, or any other merchant that offers a catalog.

The user can select one or more products from the displayed list. Responsive to the user's selection of one or more products, the system displays an order form for the selected product(s) in block 376. The order form may already include information about each selected product, as required by the form. The order form may also include user information such as, name, billing address, credit card information, and similar information about the user retrieved from the user profile. Again, the prompt information may be displayed on a television screen, while the user is using the system in a television mode. Alternatively, the prompt information may be displayed in an area within an IPG, if the user is using the system in a Guide mode. Order information from the user is received by the system in block 378, and stored locally in the system memory, as shown in block 380. At a later time, when a second trigger instruction is received by the television in block 382, the system transmits the stored order information to an order center or a merchant in block 384.

As described in the '931 patent (mentioned above), a user's profile is created by collecting information about a user. The IPG requests that the user provide certain profile information, including but not limited to: the user's zip code; television, cable, and satellite services to which the user subscribes; the length of said subscriptions; the type of television; the age of the television; where the television was purchased; the user's top favorite channels; the user's favorite types of programs; and the times during which the user is most likely to watch television. If the user declines to provide this information, the IPG will attempt to "learn" the information as described below.

In one embodiment, the IPG is capable of distinguishing between individual users and develops individualized profiles. For instance, in one embodiment, each user has an individual PIN or other identification number. In another embodiment, each user uses an individualized remote. In yet another embodiment, there is an absence of a way to distinguish one user from another. In that case, the profile is developed for the "family."

Every time the user interacts with the IPG or the television, the IPG records the user's actions and the circumstances surrounding those actions. For instance, when the user changes channels, the IPG records, among other things, information about the first channel, the changed-to channel, the time that the change was made, the identification of the programming that was displayed on the first channel, the identification of the programming that was displayed on the changed-to channel, the time of the change, the identification of any advertisement that was displayed on the first channel at the time of the change, the identification of any advertisement that was displayed on the changed-to channel, and whether the user changed channels while in one of the IPG modes, as opposed to being in the television mode. The IPG also records every instruction by the user to record or watch a program, whether the instruction is Once, Daily, Weekly, or Regularly. The IPG also records whether the user changes the volume of the television audio, and if so, what circumstances surrounded the change in volume. If the user changes channels while in one of the IPG modes, then the IPG records information about what was displayed in each of the windows of the IPG UI before and after the change.

Additionally, the IPG records information when there is an absence of interaction between the user and the television or the IPG. For instance, the IPG records whether a user continues to view an advertisement rather than changing channels. The IPG calculates and records the entire duration of the time that the television is on in any particular day.

The IPG also records information surrounding the user's interaction with external sources of information, such as the Internet. For instance, the IPG records each search query criteria initiated by the user, the Search Engine used to make the search, the items selected by the user from the search response, interaction by the user with Internet sites, and user interactions with the IPG during the same time-frame as the user interacts with the Internet.

An alternative to the above-described individual user profile information collection would be to provide on-screen survey queries. That is, the IPG could display an offer on-screen that would tell the user to call a toll-free number for the purpose of reading an on-screen encrypted number for the survey in exchange for a gift certificate. The offer could be made only to users watching a particular program or particular advertisement at a particular time. Survey responses would provide useful information further survey customization, customizing the guide, and targeting advertising.

As with television programming data, the television system may also receive advertisement data in packets. The advertisement data is then stored in an advertisement (ad) database. The advertisements typically relate to general products, services, future television programs, and the like. The advertisement data packets, according to one embodiment of the invention, comprise a scheduling component and a program component.

The two components are transmitted by an information broadcasting system. FIG. 4 is an exemplary illustration of the scheduling component. As illustrated in FIG. 4, the scheduling component includes a Start Time and 24 hours worth of ad schedules. The Start Time is the time in which the advertisements are to be displayed, and can be any time during the day. Generally speaking, however, the Start Time of the ads is 12:00 am. Following the Start Time is a Duration field and an Ad ID for each scheduled ad. The Duration field indicates the period for which a particular ad is to be displayed. In one embodiment, ad durations may range from 5 minutes to 24 hours. The Ad ID is utilized to access the ad copy (text & graphics) for a particular ad.

In addition to the schedule component, the information broadcasting system also transmits a program component. The program component allows the television system to link to an advertised show. FIG. 5 illustrates a program component according to one embodiment of the invention. As illustrated in FIG. 5, the program component includes an Ad ID, a Guide Channel, Start Time, and Duration. The Ad ID allows the Guide Channel, Start Time, and Duration fields to be associated with a particular advertisement. The television system utilizes the Guide Channel to find the program schedule information for that channel. The Start Time and Duration fields are used to find a particular program broadcast by the channel.

According to one embodiment, the Guide Channel, Start Time, and Duration information are transmitted in the order the advertisements are scheduled. For instance, the first Guide Channel, Start Time, and Duration are associated with the first scheduled advertisement, the second Guide Channel, Start Time, and Duration are associated with the second scheduled advertisement, and so forth. Thus, according to this embodiment, the information broadcasting system need not transmit the corresponding Ad IDs.

Figure 6:
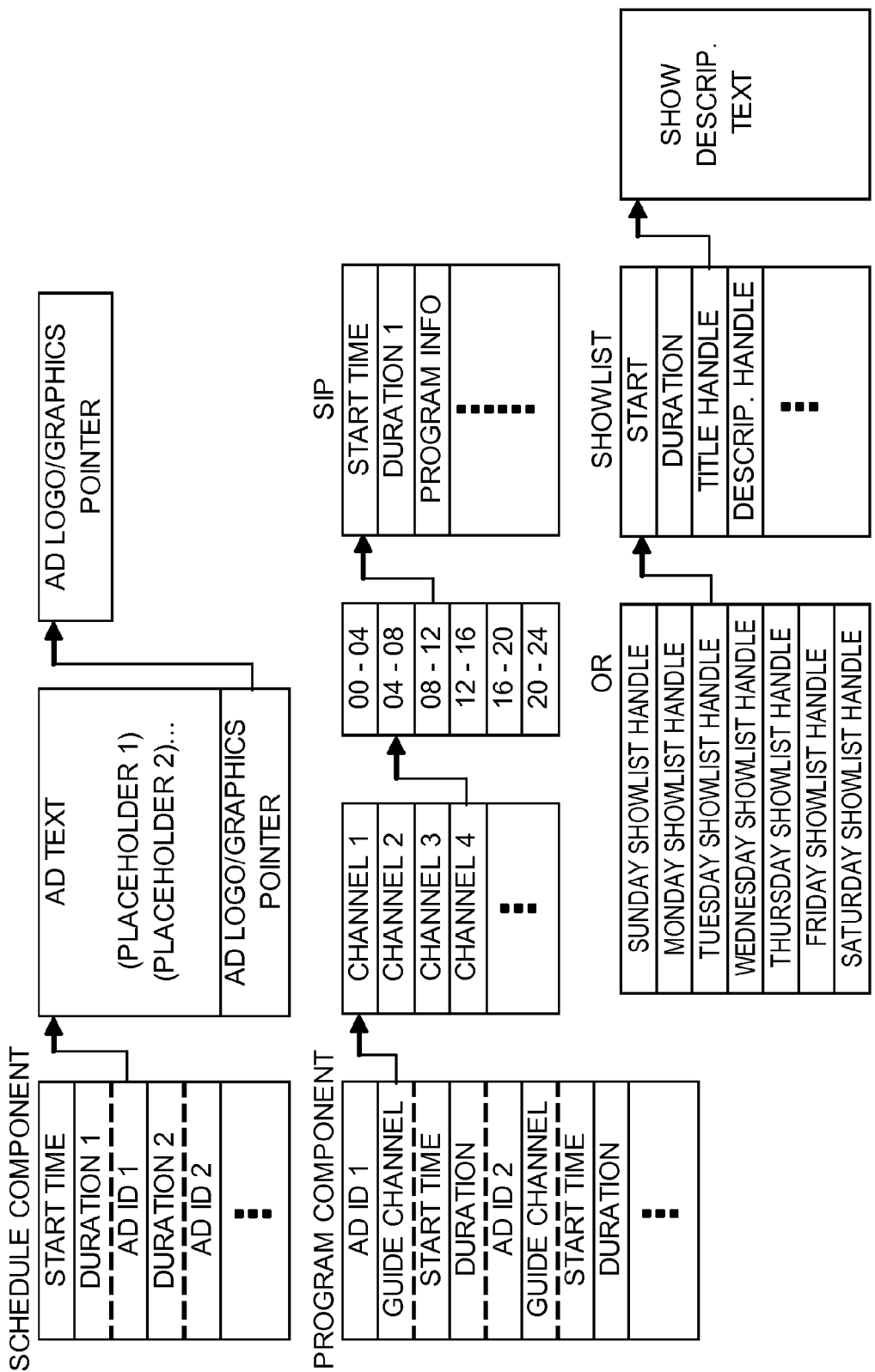
FIG. 6 is an exemplary illustration of how information is retrieved from the ad and IPG databases, in accordance with an embodiment of the present invention.

FIG. 6 is an illustration of how information is retrieved from the ad and IPG databases. Beginning at the Start Time or upon receiving a trigger instruction, the television system retrieves an Ad ID (Ad ID1 in this example), and locates the corresponding ad copy in the advertisement database. Each ad copy includes a text field and a pointer to a logo/graphics. The text field contains special tags which serve as placeholders for particular values. These placeholders might reserve space in the ad copy for the air time of an advertised show, an episode's title/description, or any other information available from the IPG database. Accordingly, advertisements may be modified based on the information stored in the IPG database, and it no longer becomes necessary to create new advertisements for different time zones or different episode descriptions.

The ad entry further includes a pointer to an ad logo, if appropriate. The ad logo includes a graphics file of a logo (e.g., the NBC logo) or any other graphics data that is to be displayed with the ad. The television system utilizes the program component to link advertisements to the corresponding television programs. This allows the television system to insert the appropriate information into the placeholders of the text of an advertisement. In addition, the linking of programs to advertisements (about a television program) allows a user to schedule a show: for watching or viewing directly from the advertisement.

In linking advertisements to corresponding television programs according to one embodiment of the invention, the Guide Channel of the program component is used to locate a map of pointers for a particular channel, each pointer corresponding to a show information package that contains data for a four-hour block of television programming for that particular channel. The Duration field allows the system to retrieve a particular program information within in a show information package. When the particular program is located, the television system retrieves values necessary for inserting information into the placeholders of the corresponding advertisement. For instance, the program description may be retrieved from the show information package Land inserted into a program description placeholder within the ad. Furthermore, the time in which the program is to air may be retrieved and inserted into an air-time placeholder.

According to one embodiment, the IPG database contains programming information for an entire week. In this case, the Guide Channel is used to locate a showlist handle table with a handle to a showlist for a particular channel for the current day. The Start Time and Duration fields are used to locate the appropriate show description entry.

In another embodiment of the invention, the program component is not sent as a packet, but is created within the television system based on information transmitted with the advertisements in the scheduling component. According to this embodiment, the information broadcasting system transmits with the scheduling component, the title of the program being searched for, a time range in which the show will be broadcast, and a network station indicator for finding the network station broadcasting the program. For instance, the ad may contain instructions to "link to NBC show 'Friends' on Thursday evening." With this information, the television system searches the IPG database for the show 'Friends,' and creates the program component for the corresponding ad. In this way, a television system capable of tuning to multiple NBC affiliates would select the channel of the NBC affiliate which the television system is in fact tuned to.

While the illustrated embodiments have been described in connection with modifying time and program descriptions for an advertisement of a future television program, it will be appreciated that other types of advertisement information may be modified if desired. Additionally, the advertisement linked with the programs may also be linked with the user profile in a similar way. This way, different ads can be displayed to different users based on their respective user profiles.

Information related to the advertised product and/or service, such as price, telephone number, point of sales, web site address, dates of promotions, and the like may also be modified based on the information stored in the IPG database. For example, if the web site address of a product merchant is changed, only the new web site address needs to be transmitted and then inserted to the appropriate field of the stored advertisement when it is displayed in the IPG. Alternatively, the web site address may be retrieved form the IPG database and combined with a portion of the stored advertisement. In another example, the advertisement rotation information such as starting time and duration, and frequency of display can be retrieved from the IPG database and combined with the advertisement content stored in the ad database for displaying in the IPG.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for preprogrammed purchasing of television offered products, comprising:
    prompting a user to input order information for one of the television offered products prior to the product becoming available for purchase, wherein the product is provided by a merchant;
    receiving the order information from the user;
    storing the received order information in a memory;
    at a remote source:
        generating a trigger instruction that includes information associated with the product;
        determining whether the product has become available for purchase; and
        broadcasting the trigger instruction in response to determining that the product has become available for purchase;
    receiving the trigger instruction, from the remote source, over a television signal, wherein the remote source is different from the merchant; and
    without further input from the user, transmitting the stored order information to the merchant at a remote site, responsive to the received trigger instruction.

2. The method of claim 1 wherein the trigger instruction is received in a vertical blanking interval (VBI) of the television signal.

3. The method of claim 1, further comprising receiving information about one or more products in the VBI of the television signal.

4. The method of claim 1, further comprising storing information about one or more products in a memory.

5. The method of claim 1 wherein the prompting step comprises:
    displaying information about a plurality of products;
    selecting one or more products from the displayed information; and
    displaying an order form for the user.

6. The method of claim 5, wherein the information about a plurality of products and the order form are displayed in an interactive programming guide.

7. The method of claim 5, wherein the information about a plurality of products and the order form are displayed in a full screen television mode.

8. The method of claim 5, wherein the displaying information about a plurality of products is based on a user profile.

9. The method of claim 5, wherein the displayed order form includes information about the one or more selected products.

10. The method of claim 5, wherein the displayed order form includes information about the user based on a user profile.

11. The method of claim 5, wherein the displayed information about a plurality of products includes one or more of text, graphics, and video.

12. The method of claim 1, wherein the prompting step comprises:
    displaying information about a product; and
    displaying an order form for the user.

13. The method of claim 12, wherein the information about the product and the order form are displayed in an interactive programming guide.

14. The method of claim 12, wherein the information about the product and the order form are displayed in a full screen television mode.

15. The method of claim 12, wherein the displaying information about a product is based on a user profile.

16. The method of claim 12, wherein the displayed order form includes information about the product.

17. The method of claim 12, wherein the displayed order form includes information about the user based on a user profile.

18. The method of claim 17, wherein the information about the user includes one or more of user's name, user's address and a credit card number.

19. The method of claim 12, wherein the displayed information about the product includes one or more of text graphics, and video.

20. The method of claim 1, further comprising receiving information about one or more products in the trigger instruction.

21. The method of claim 1, wherein the transmitting step comprises transmitting the stored order information to a remote site via a wireless network.

22. The method of claim 1, wherein the transmitting step comprises transmitting the stored order information to a remote site via a telephone network.

23. The method of claim 1, wherein the transmitting step comprises transmitting the stored order information to a remote site via the Internet.

24. The method of claim 1 wherein the transmitting step comprises transmitting the stored order information to a remote site via a pager network.

25. The method of claim 1, wherein the product is a tangible item available for purchase.

26. The method of claim 1, further comprising:
    displaying a list of the television offered products, wherein the products in the list are offered by the merchant at a future time, and wherein the list includes the product; and
    receiving, from the user, a selection of the product from the list;
    wherein the trigger is broadcast at the future time in response to the selected product becoming available.

27. The method of claim 26, wherein the list of products comprises a catalogue offered by the merchant.

28. The method of claim 1, wherein prior to the product becoming available for purchase comprises prior to the product becoming available for purchase at a particular price.

29. A method for preprogramming a purchase of television offered products, comprising:
    receiving information about one of the television offered products, wherein the product is provided by a merchant;
    storing the information about the product in a memory;

receiving a first trigger instruction, from a remote source, over a television signal, prior to the product becoming available for purchase wherein the remote source is different from the merchant;

displaying the information about the product, responsive to the first trigger instruction;

displaying an order form for a user to input order information for the product, responsive to the first trigger instruction;

receiving the order information from the user;

storing the received order information in the memory;

at the remote source:
generating a second trigger instruction that includes information associated with the product;
determining whether the product has become available for purchase; and
broadcasting the second trigger instruction in response to determining that the product has become available for purchase;

receiving the second trigger instruction, from the remote source, over the television signal; and without further input from the user, sending the stored order information to the merchant at a remote site, responsive to the received second trigger instruction.

30. The method of claim 29 wherein the information about the product and the order form are displayed in an interactive programming guide.

31. The method of claim 29 wherein the information about the product and the order form are displayed in a full screen television mode.

32. The method of claim 29 wherein the first and second trigger instructions are received in a vertical blanking interval (VBI) of the television signal.

33. The method of claim 29, wherein the receiving information about a product is according to a user profile.

34. The method of claim 29, wherein the displaying information about a product is according to a user profile.

35. The method of claim 29, wherein the displayed order form includes information about the product.

36. The method of claim 29, wherein the displayed order form includes information about the user according to a user profile.

37. The method of claim 36, wherein the information about the user includes one or more of user's name, user's address, and a credit card number.

38. The method of claim 29, wherein the displayed information about the product includes one or more of text, graphics, and video.

39. The method of claim 29, wherein the sending step comprises sending the stored order information to a remote site via a wireless network.

40. The method of claim 29, wherein the sending step comprises sending the stored order information to a remote site via a telephone network.

41. The method of claim 29, wherein the sending step comprises sending the stored order information to a remote site via the Internet.

42. The method of claim 29, wherein the sending step comprises sending the stored order information to a remote site via a pager network.

43. The method of claim 29, wherein the product is a tangible item available for purchase.

44. The method of claim 29, wherein prior to the product becoming available for purchase comprises prior to the product becoming available for purchase at a particular price.

45. A television system for preprogramming a purchase of television offered products, comprising:

a remote source that:
generates a trigger instruction that includes information associated with the product;
determines whether of one of the television products has become available for purchase; and
broadcasts the trigger instruction in response to determining the product has become available for purchase;

a receiver for receiving the trigger instruction, from the remote source, over a television signal;

a display processor for prompting a user to input order information for the product prior to the product becoming available for purchase, wherein the product is provided by a merchant different from the remote source;

a user interface for receiving the order information from the user;

a memory for storing the received order information; and a back channel for, without further input from the user, transmitting the stored order information to the merchant at a remote site, responsive to the received trigger instruction.

46. The television system of claim 45, wherein the trigger instruction is received by the receiver in a vertical blanking interval (VBI) of the television signal.

47. The television system of claim 45, the receiver further receives information about one or more products in the VBI of the television signal.

48. The television system of claim 45, wherein the memory further stores information about one or more products.

49. The television system of claim 45, wherein the back channel transmits the stored order information to a remote site via a wireless network.

50. The television system of claim 45 wherein the back channel transmits the stored order information to a remote site via a telephone network.

51. The television system of claim 45 wherein the back channel transmits the stored order information to a remote site via the Internet.

52. The television system of claim 45 wherein the back channel transmits the stored order information to a remote site via a pager network.

53. The system of claim 45, wherein the product is a tangible item available for purchase.

54. The television system of claim 45, wherein prior to the product becoming available for purchase comprises prior to the product becoming available for purchase at a particular price.

55. A television system for preprogramming a purchase of television offered products, comprising:

means for receiving information about one of the television offered products, wherein the product is provided by a merchant;

means for storing the information about the product;

means for receiving a first trigger instruction, from a remote source, over a television signal prior to the product becoming available for purchase, wherein the remote source is different from the merchant;

means for displaying the information about a product, responsive to the first trigger instruction;

means for displaying an order form for a user to input order information for the product, responsive to the first trigger instruction;

means for receiving the order information from the user;

means for storing the received order information;

means for, at the remote source:
generating a second trigger instruction that includes information associated with the product;

determining whether the product has become available for purchase; and broadcasting the second instruction in response to determining that the product has become available for purchase;

means for receiving the second trigger instruction, from the remote source, over the television signal; and means for, without further input from the user, sending the stored order information to the merchant at a remote site, responsive to the received second trigger instruction.

56. The system of claim 55, wherein the product is a tangible item available for purchase.

57. The television system of claim 55, wherein prior to the product becoming available for purchase comprises prior to the product becoming available for purchase at a particular price.

\* \* \* \* \*